United States Patent [19]
Yamada et al.

[11] Patent Number: 5,751,522
[45] Date of Patent: May 12, 1998

[54] COMBINED-TYPE THIN FILM MAGNETIC HEAD WITH INDUCTIVE MAGNETIC HEAD HAVING LOW-INDUCTIVE CORE

[75] Inventors: Minoru Yamada, Sakae-machi; Hideyuki Hashimoto, Nagaoka; Yasuhiro Yabe, Nagaoka; Kenji Honda, Nagaoka, all of Japan

[73] Assignee: Alps Electric Co., Ltd., Tokyo, Japan

[21] Appl. No.: 712,662

[22] Filed: Sep. 13, 1996

Related U.S. Application Data

[63] Continuation of Ser. No. 324,429, Oct. 17, 1994, abandoned.

[30] Foreign Application Priority Data

Oct. 21, 1993 [JP] Japan ................... 5-285513

[51] Int. Cl.$^6$ ................................................ G11B 5/39
[52] U.S. Cl. .................................... 360/113; 360/126
[58] Field of Search ................................ 360/113, 126, 360/121

[56] References Cited

U.S. PATENT DOCUMENTS

| | | | |
|---|---|---|---|
| 3,908,194 | 9/1975 | Romankiw | 360/113 |
| 3,975,772 | 8/1976 | Lin | 360/113 |
| 4,841,398 | 6/1989 | Mowry | 360/113 |
| 4,907,113 | 3/1990 | Mallary | 360/113 |
| 4,967,298 | 10/1990 | Mowry | 360/113 |
| 5,208,715 | 5/1993 | Mowry | 360/113 |
| 5,212,609 | 5/1993 | Yuito et al. | 360/113 |
| 5,255,141 | 10/1993 | Valstyn et al. | 360/113 |
| 5,438,747 | 8/1995 | Kroumbi et al. | 360/113 |

*Primary Examiner*—Jefferson Evans
*Assistant Examiner*—David D. Davis
*Attorney, Agent, or Firm*—Guy W. Shoup

[57] ABSTRACT

A combined-type thin film magnetic head in which a reproducing head portion including a magnetoresistive device and an inductive magnetic head are laminated. A coil support portion made of the same plated layer that forms an upper gap layer of the reproducing head portion having the magnetoresistive device and a lower core portion separated from the magnetic material layer by a gap δ are formed on the surface of the upper gap layer. The coil support portion and the lower core portion have areas that enable a coil layer to be formed so that the coil layer is enabled to be formed on a region having no step. An upper core layer is formed on the lower core portion in such a manner that the coil layer is held therebetween. A magnetic gap is formed between the two core layers. Since the magnetic passage of the lower core portion has a small cross sectional area, the inductance of the magnetic circuit can be lowered.

1 Claim, 6 Drawing Sheets

COMBINED-TYPE THIN FILM MAGNETIC HEAD WITH INDUCTIVE MAGNETIC HEAD HAVING LOW-INDUCTIVE CORE

This application is a continuation of application Ser. No. 08/324,429, filed Oct. 17, 1994 now abandoned.

BACKGROUND OF THE INVENTION

This invention relates to a thin film magnetic head for use as a floating magnetic head, and more particularly to a combined-type thin film magnetic head in which a reproducing head portion having a magnetoresistive device and an inductive magnetic head having a coil layer and a core layer are laminated.

DESCRIPTION OF THE PRIOR ART

Figure 7:
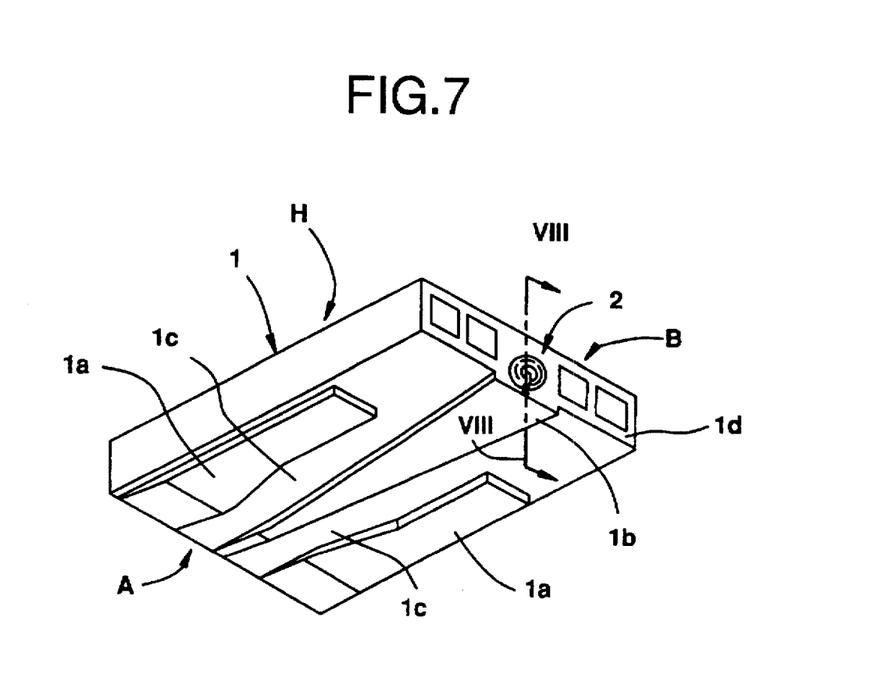
FIG. 7 is a perspective view which illustrates a floating magnetic head as an applicable example of the combined-type thin film magnetic head.

FIG. 7 illustrates a floating magnetic head H for a hard disk serving as an example of the combined-type thin film magnetic head.

A slider 1 of the magnetic head H consists of side A serving as a leading side that faces the upstream portion in the direction in which the disk surface is moved and side B serving as a trailing side. The surface of the slider 1 that faces the disk has rail-shape surfaces 1a and 1b made of ABS and an air group 1c. A combined-type thin film magnetic head 2 is formed on a trailing end surface 1d of the slider 1.

Figure 8:
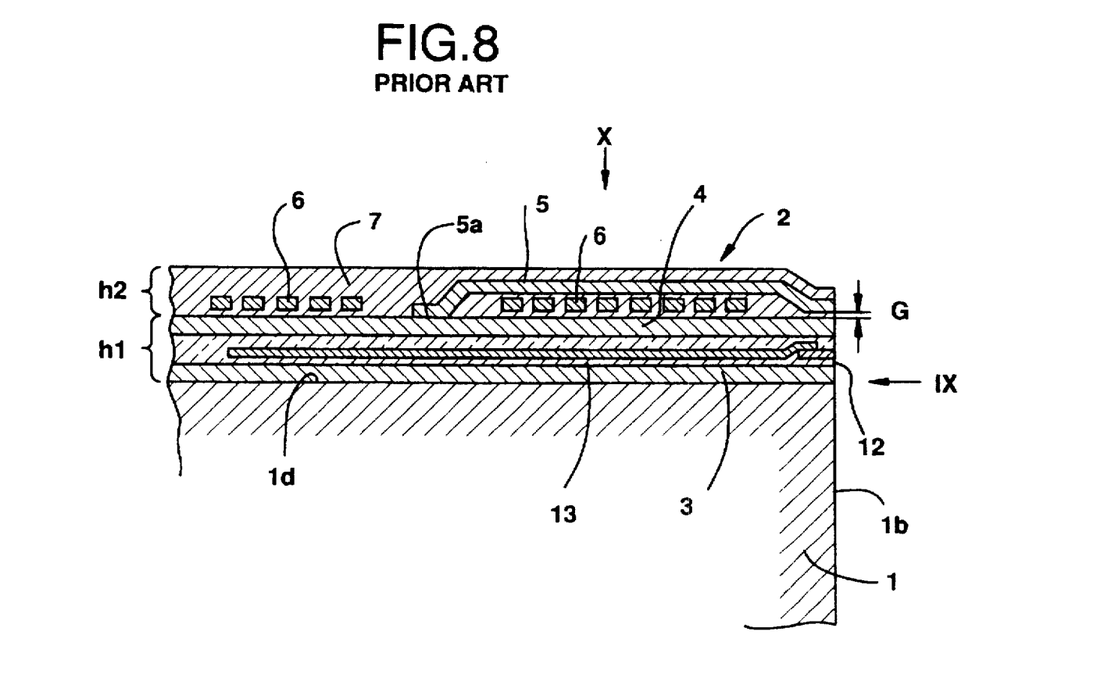
FIG. 8 is an enlarged cross sectional view taken along line VIII—VIII and illustrating the structure of a conventional combined-type thin film magnetic head.
Figure 9:
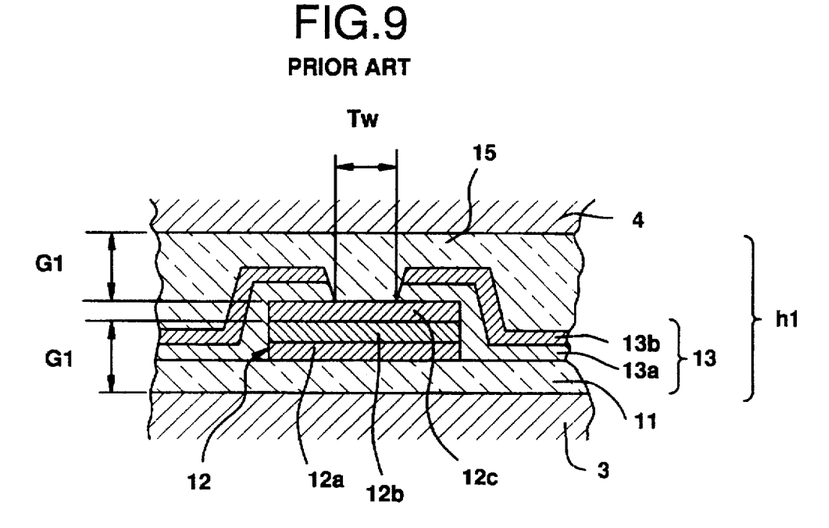
FIG. 9 is an enlarged front view taken in a direction of an arrow IX shown in FIG. 8.
Figure 10:
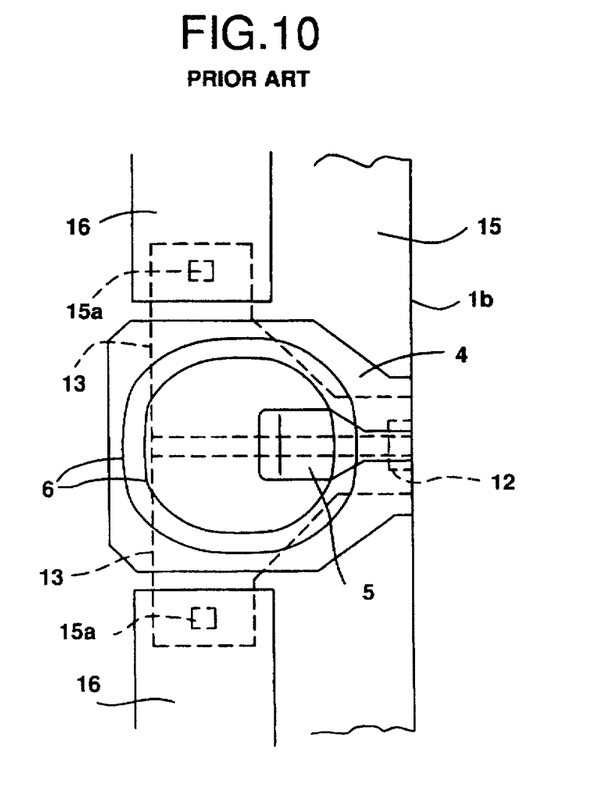
FIG. 10 is a plan view taken in a direction of an arrow X shown in FIG. 8.

FIG. 8 is an enlarged cross sectional view taken along line VIII—VIII shown in FIG. 7 and illustrating a laminated structure of the combined-type thin film magnetic head 2. FIG. 9 is a partially enlarged front view taken in a direction designated by an arrow IX shown in FIG. 8. FIG. 10 is a plan view taken in a direction designated by an arrow X shown in FIG. 8.

The combined-type thin film magnetic head 2 has a structure in which a reproducing head portion h1 including a magnetoresistive device (an MR device) 12 and an inductive magnetic head h2 are laminated.

The reproducing head portion h1 has, as shown in FIG. 9, a lower shield layer 3 on the trailing end surface of the slider 1, the lower shield layer 3 being a Permalloy (NiFe) layer manufactured by, for example, plating. A non-magnetic lower gap layer 11 is formed on the surface of the lower shield layer 3. A magnetoresistive device (a MR device) 12 is stacked on the lower gap layer 11. The MR device 12 consists of three layers consisting of, when viewed from a lower portion, a SAL film 12a, a non-magnetic SHUNT film 12b and an MR film 12c having a magnetoresistive effect.

An electrode layer 13 is formed from the two top corners of the MR device 12 to the surface of the lower gap layer 11. The electrode layer 13 consists of a lower antiferromagnetic layer (hereinafter called an "AF layer") 13a and an upper electroconductive layer 13b mainly made of tungsten (W). The surfaces of the electrode layers 13 are covered with an upper gap layer 15 made of alumina or the like. An upper shield layer 4, which is, for example, a Permalloy layer formed by plating, is formed on the upper gap layer 15. The reproducing head portion h1 has a gap length (G1) that is determined in accordance with the distance from the MR film 12c to the lower shield film 3 or the upper shield layer 4. The track width Tw is determined in accordance with a range in which a sense electric current flows through the MR film 12c between the two electrode layers 13.

As shown in FIG. 10, leading layers 16 obtained by etching from the same Permalloy plated layer together with the upper shield layer 4 is formed on the surface of the upper gap layer 15. The electrode layers 13 extend to the positions at which they overlap with the leading layers 16. The electrode layers 13 and the leading layers 16 are electrically connected through contact holes 15a formed in the upper gap layer 15.

In the inductive magnetic head h2, the upper shield layer 4 is also used as a lower core layer. An upper core layer 5 formed into a flat shape as shown in FIG. 10 is formed on the surface of the upper shield layer 4. Furthermore, a coil layer 6 is formed which has a flat and spiral shape, the center of which is substantially a connection portion 5a between the upper shield layer 4 and the upper core layer 5. The upper core layer 5 and the coil layer 6 are covered with an insulating layer and a protective film 7. The portion, in which the upper shield layer 4 also serving as the core and the upper core layer 5 face each other, appears in a surface 1b made of ABS so that a recording magnetic gap G for the inductive magnetic head is formed.

In the foregoing conventional combined-type thin film magnetic head 2, the upper shield layer 4 of the reproducing head portion h1 is also used as the lower core layer of the inductive magnetic head h2 formed on the reproducing head portion h1. The upper shield layer 4 also serving as the core has a wide area to enable the coil layer 6 to be formed thereon. By forming a smooth insulating layer on the upper shield layer 4, the coil layer 6 can be, by etching, formed on the smooth surface having no steps.

However, the wide area of the upper shield layer 4 also serving as the core causes the cross sectional area of the magnetic passage in the upper shield layer 4 to be enlarged. Since the inductance of a magnetic circuit consisting of the upper shield layer 4, the upper core layer 5 and the coil layer 6 is in proportion to the cross sectional area of the magnetic passage, the conventional combined-type thin film magnetic head suffers from a large inductance of the magnetic circuit thereof. If the inductance is too large, the resonant frequency of the magnetic circuit is lowered and an efficiency of recording high frequency signals deteriorates. Thus, data cannot be recorded on a recording medium at a satisfactory high density.

SUMMARY OF THE INVENTION

The present invention is intended to overcome the problems experienced with the conventional structures and an object of the same is to provide a combined-type thin film magnetic head which is capable of lowering the inductance of a magnetic circuit of an inductive magnetic head and facilitating forming of the coil layer into a flat shape.

According to the present invention, there is provided a combined-type thin film magnetic head in which a reproducing head portion that includes a magnetoresistive device and an inductive magnetic head are laminated, wherein the inductive magnetic head has a magnetic material layer having the area that enables a coil layer to be formed, a portion of the magnetic material layer is separated so that a lower core layer is formed, an upper core layer connected to the upper surface of the lower core layer and extending to an upper position of the coil layer is formed, and a magnetic gap is formed between the lower core layer and the upper core layer.

The magnetic material layer and the lower core layer formed by separating a portion of the magnetic material layer can be used as shield layers to be formed on the gap layer of the reproducing head portion.

The inductive magnetic head according to the present invention comprises the lower core layer formed by separating a portion of the magnetic material layer that has the area which enables a coil layer to be formed. Thus, the planar shape of the lower core layer can be reduced and therefore the cross sectional area of the magnetic passage can be reduced. Therefore, the inductance of a magnetic circuit consisting of the lower core layer, the upper core layer and the coil layer can be lowered. As a result, the recording efficiency can be improved and high density recording can be enabled. Since the coil layer is formed on the magnetic material layer and the lower core layer having sufficiently large areas, generation of a step or the like in the region in which the coil layer will be formed can be prevented. Therefore, the coil layer can be formed precisely on a flat surface similarly to the conventional structure.

Other and further objects, features and advantages of the invention will be appear more fully from the following description.

BRIEF DESCRIPTION OF THE DRAWINGS

FIGS. 4 (A) to 4 (F) are cross sectional views which illustrate steps of a frame plating method for forming a coil support portion and a lower core portion;

DESCRIPTION OF THE PREFERRED EMBODIMENT

Preferred embodiment of the present invention will now be described.

Figure 1:
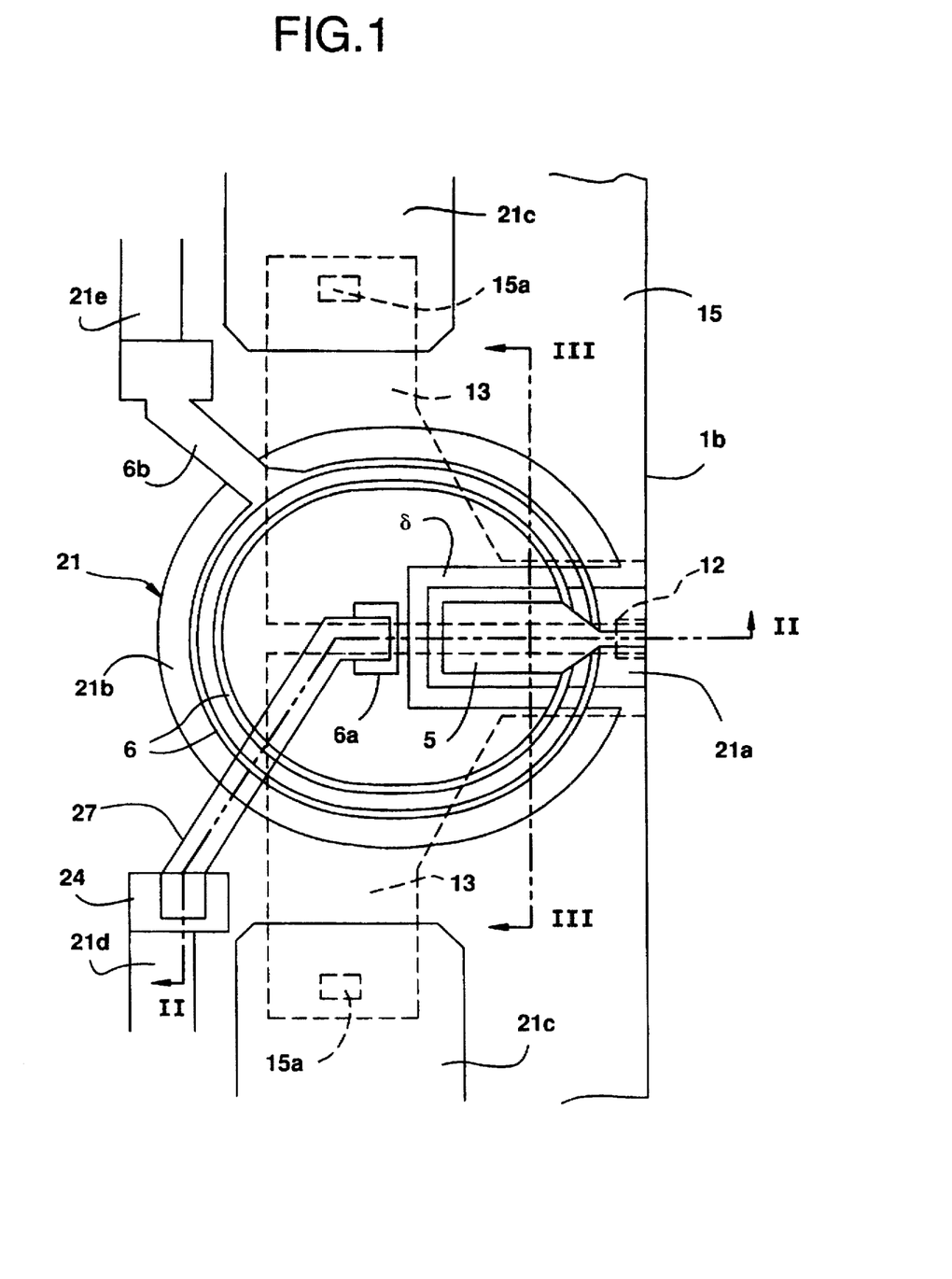
FIG. 1 is a plan view which illustrates an embodiment of a combined-type thin film magnetic head according to the present invention.
Figure 2:
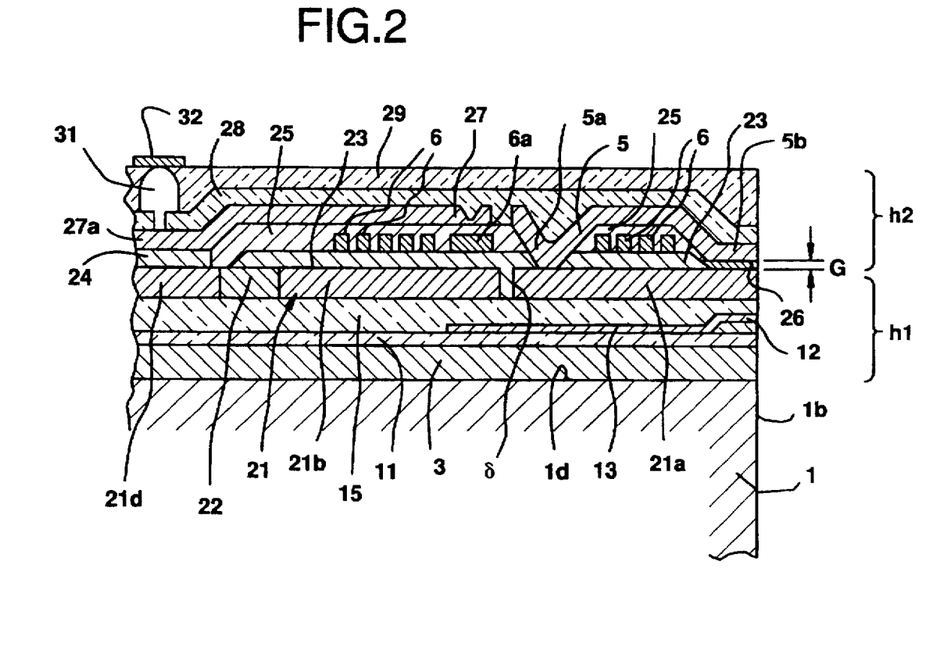
FIG. 2 is a cross sectional view of the combined-type thin film magnetic head shown in FIG. 1 and taken along line II—II of FIG. 1.
Figure 3:
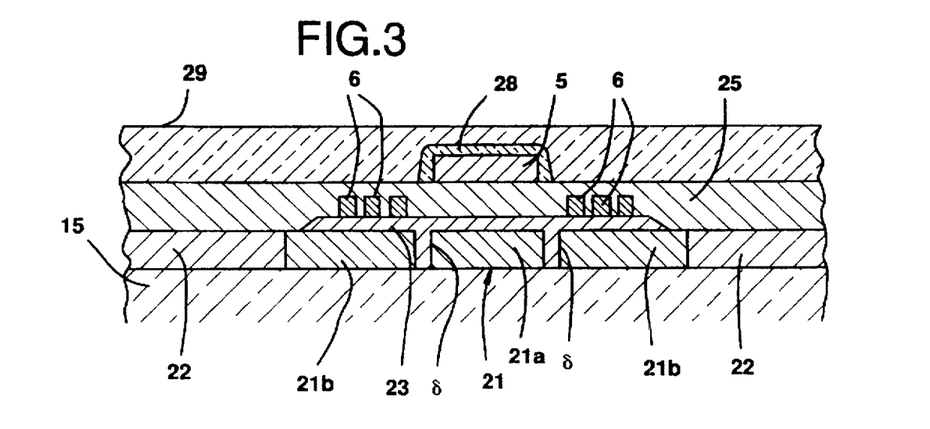
FIG. 3 is a cross sectional view of the combined-type thin film magnetic head shown in FIG. 1 and taken along line III—III of FIG. 1.

FIG. 1 is plan view which illustrates a combined-type thin film magnetic head formed on a trailing-directional-end surface 1d of a slider 1 of a floating magnetic head as shown in FIG. 7. FIG. 2 is an enlarged cross sectional view taken along line II—II shown in FIG. 1. FIG. 3 is an enlarged cross sectional view taken along line III—III shown in FIG. 1.

As shown in FIG. 2, the combined-type thin film magnetic head has a structure in which a reproducing head portion h1 and a recording inductive magnetic head h2 are laminated.

In the reproducing head portion h1, a lower shield layer 3 is, by plating Permalloy (NiFe), formed on the trailing-directional end surface 1d of the slider 1. An alumina ($Al_2O_3$) lower gap layer 11 is formed on the lower shield layer 3. In a portion of the slider 1 that appears on the surface 1b made of ABS, an MR device 12 is formed on the lower gap layer 11. The MR device 12 has laminated three layers consisting of, from a lower portion, a SAL film 12a, a SHUNT film 12b and an MR film 12c.

Electrode layers 13 are formed from the two top corners of the MR device 12 to the top surface of the lower gap layer 11. Each of the electrode layers 13 is formed by stacking an AF layer mainly made of FeMn and an electroconductive layer mainly made of tungsten (W). The layers of the electrode layer 13 consist of, from a lower portion, NiFe/FeMn/Ta/W/Ta. The NiFe and Ta layers are layers for hermetically holding other layers. An upper gap layer 15 made of alumina is formed on the MR device 12 and the electrode layers 13.

Figure 4A:
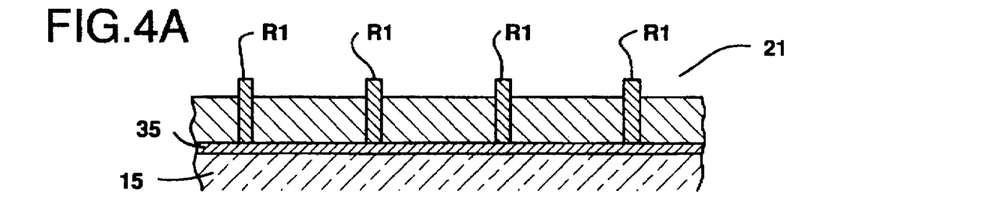
Figure 4B:
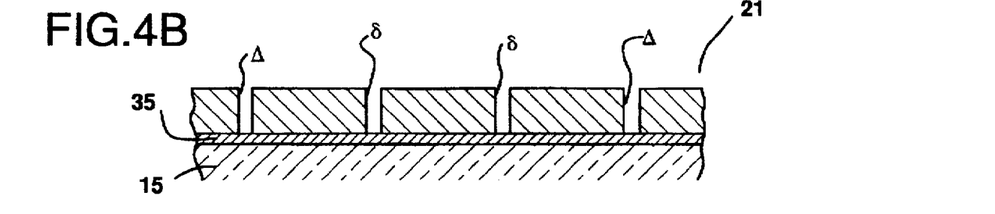
Figure 4C:
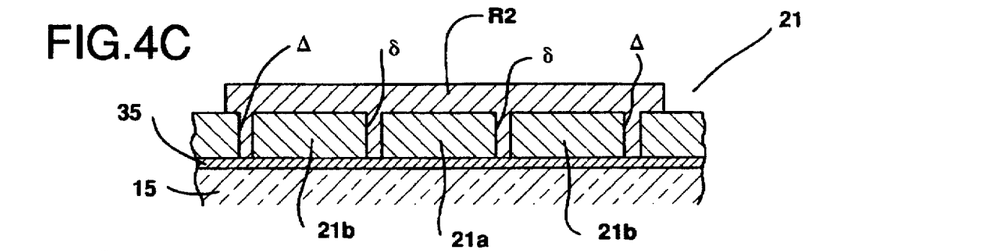
Figure 4D:
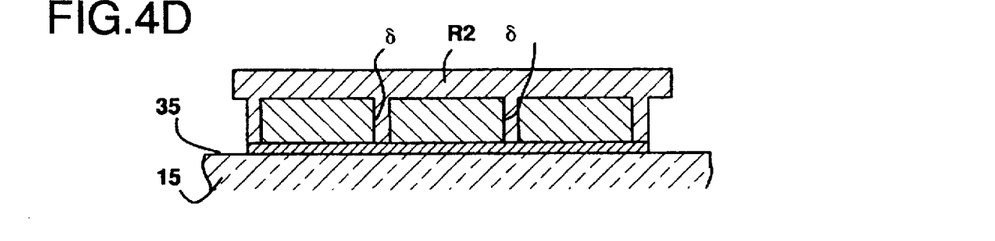
Figure 4E:
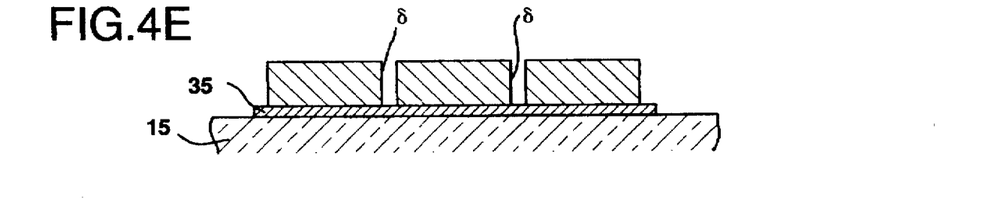
Figure 4F:
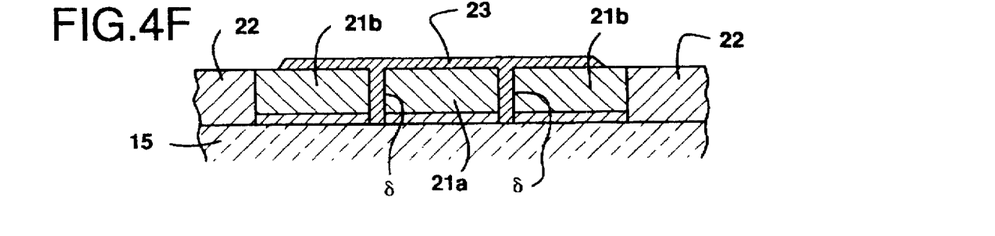
Figure 5:
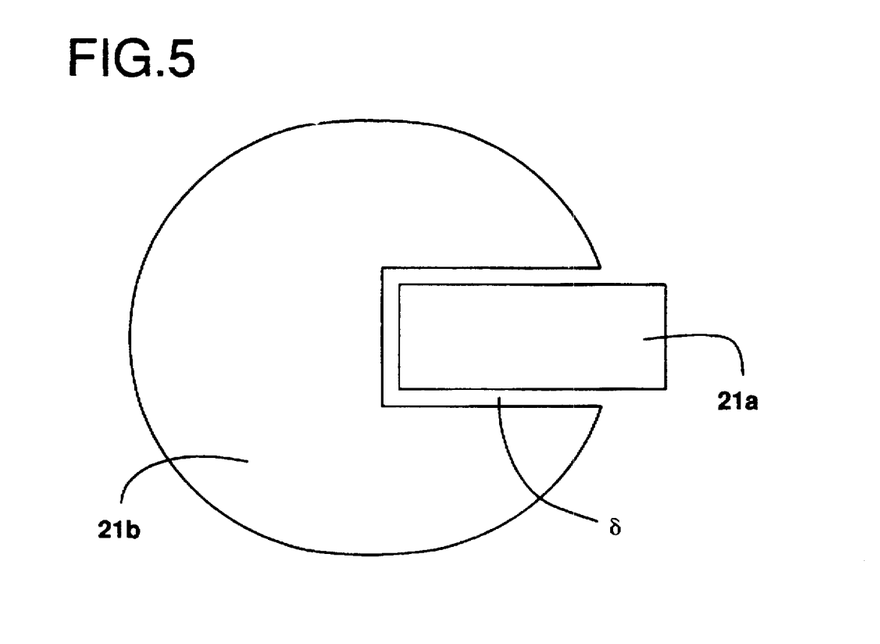
FIG. 5 is a plan view which illustrates the shapes of the lower core portion and a coil support portion shown in FIG. 1.

A magnetic material layer 21 is formed on the surface of the upper gap layer 15 by electrolytic plating Permalloy (NiFe). By forming the magnetic material layer 21 by a frame plating method shown in FIG. 4 before it is subjected to etching, the following Permalloy layers can be formed: lower core portion 21a, coil support portion 21b, leading layers 21c, and terminal raising layers 21d and 21e. As shown in FIGS. 1 and 5, the coil support portion 21b has a substantially elliptic plane shape. A portion of the coil support portion 21b is separated by a narrow gap δ so that a narrow and elongated lower core portion 21a is formed. The lower core portion 21a is formed to cover the portion above the MR device 12. That is, the lower core portion 21a and the coil support portion 21b are also used as upper shield layers formed on the upper gap layer 15 of the reproducing head portion h1.

As shown in FIG. 1, the leading layers 21c are formed apart from the two horizontal ends of the coil support portion 21b. The electrode layers 13 extend to positions below the leading layers 21c. Contact holes 15a are formed in the upper gap layer 15 between the electrode layers 13 and the leading layers 21c. The electrode layers 13 and the leading layers 21c are electrically connected through the contact holes 15a.

As shown in FIGS. 2 and 3, an organic insulating layer 22 made of a resist film or the like is formed between the coil support portion 21b and the terminal raising layers 21d and 21e and between the coil support portion 21b and the leading layers 21c.

As shown in FIGS. 2 and 3, an organic insulating layer 23 made of a resist film is formed on the coil support portion 21b and the lower core layer 21a. The surface of the organic insulating layer 23 is a smooth surface for forming a coil layer. When the organic insulating layer 23 is formed, its organic insulating material is injected into the narrow gap δ having a U-shape facing side and formed between the coil support portion 21b and the lower core portion 21a. Since the gap δ is a small gap, the introduction of the organic insulating material into the gap δ does not deteriorate the smoothness of the surface of the organic insulating layer 23. If there is a risk of generation of a step on the surface of the organic insulating layer 23 due to the introduction of the organic insulating material into the gap δ, the following method may be employed which comprises the steps of: initially forming the organic insulating layer 22 in the gap δ; making the surfaces of the coil support layer 21b, the lower core portion 21a and the gap δ to be the same plane; and forming the organic insulating layer 23 on the foregoing plane.

A coil layer 6 is formed on the smoothed organic insulating layer 23. The coil layer 6 is formed such that a copper (Cu) layer having a predetermined thickness is formed on the organic insulating layer 23 and then etching is performed to have a spiral shape. A lead layer 6b (see FIG. 1) is continuously and integrally formed with the outermost coil layer 6, the lead layer 6b being the same Cu layer which forms the coil layer 6. The leading layer 6b is stacked on the terminal raising layer 21e. Note that the illustrated coil layer 6 has concentric and elliptic annuli shape for the purpose of simplifying the illustration. When the coil layer 6 is, by etching, formed from the Cu layer, an electrode layer 24 is formed on the terminal raising layer 21d by etching the same Cu layer.

As shown in FIG. 2, an organic insulating layer 25 is formed on the coil layer 6. Furthermore, an upper core layer 5 is formed on the organic insulating layer 25 at a position above the lower core portion 21a. The upper core layer 5 is formed by plating Permalloy. A base portion 5a of the upper core layer 5 is electrically connected to the surface of the lower core portion 21a through a contact hole formed in the organic insulating layers 23 and 25. On the surface 1b made of ABS, a gap layer 26 made of $Al_2O_3$ or $SiO_2$ is formed between a leading portion 5b of the upper core layer 5 and the lower core portion 21a so that a recording magnetic gap G of the inductive magnetic head h2 is formed.

When the upper core layer 5 is formed, a lead layer 27 is formed between a central end 6a of the coil layer 6 and the electrode layer 24 on the terminal raising layer 21d by etching the Permalloy plated layer.

As shown in FIG. 2, an insulating layer 28 is formed on the upper core layer 5 and the lead layer 27. Furthermore, a protective film 29 made of alumina is formed on the insulating layer 28. A bump 31 is, by plating, formed on a leading portion 27a of the lead layer 27, the bump 31 electrically connecting a terminal 32 formed on the surface of the protective film 29 and the lead layer 27 to each other.

In this embodiment, the magnetic circuit of the inductive magnetic head is formed by the lower core portion 21a, the upper core layer 5 and the coil layer 6 in such a manner that the lower core portion 21a is formed into an elongated shape that enables the cross sectional area of the magnetic passage to be reduced. Therefore, the inductance of the magnetic circuit can be reduced as compared with the conventional structure. As a result, the resonant frequency of the magnetic circuit can be raised; the recording efficiency can be improved; and a high density recording can be performed.

The coil support portion 21b and the lower core portion 21a, which is separated from the coil support portion 21b gap δ and formed from the same magnetic material layer 21 are formed under the region in which the coil layer 6 is formed, the coil support portion 21b and the lower core portion 21a having the same thickness. Since the width of the gap δ is narrow enough, the organic insulating layer 23 to be formed on the coil support portion 21b and the lower core portion 21a can be formed into a smooth layer. Therefore, the coil layer 6 can precisely be formed on the flat surface.

The lower core portion 21a and the coil support portion 21b that are separated from each other by the small gap δ as described above can be formed by the frame plating method arranged, for example, as shown in FIG. 4. FIG. 4 illustrates, on the same cross section as that shown in FIG. 3, a process for forming the lower core portion 21a and the coil support portion 21b.

The frame plating method is, in this embodiment, performed in such a manner that a thin base film 35 made of Permalloy or the like is initially formed on the surface of the upper gap layer 15 by sputtering or the like as shown in FIG. 4 (A). A resist film R1 is formed on the base film 35 by patterning. On the other hand, the Permalloy (magnetic material) layer 21 is formed on the surface of the base film 35 in a region in which the resist film R1 is not formed. Then, the resist film R2 is removed, thus resulting in that the magnetic material layer 21 separated by gaps δ and Δ as shown in FIG. 4 (B) can be formed.

Then, a cover resist film R2 is formed on the magnetic material layer 21 in a region that forms the outlines of the lower core portion 21a and the coil support portion 21b as shown in FIG. 4 (C). A cover resist film R2 is injected into the gaps δ and Δ. Then, the outer plated layer of the lower core portion 21a and the coil support portion 21b is removed by etching as shown in FIG. 4 (D).

In the next place, the cover resist film R2 is removed as shown in FIG. 4 (E) so that sectioned Permalloy plated layers are formed on the continuous base film 35.

When unnecessary portion of the base film 35 is removed subsequently as shown in FIG. 4 (F), the coil support portion 21b and the lower core portion 21a separated from the coil support portion 21b by the gap δ can be formed.

As a result of the foregoing sequential process, also the leading layers 21c and terminal raising layers 21d and 21e are formed from the same Permalloy plated layer 21.

Then, the organic insulating layer 22 is formed around the magnetic material layer 21b and the lower core layer 21a as shown in FIG. 4 (F). Furthermore, the organic insulating layer 23 is formed on the surfaces of the lower core portion 21a and the coil support portion 21b. Simultaneously, the organic insulating material is injected into the gaps δ. Subsequently the coil layer 6 is formed on the smoothed organic insulating layer 23 as described above.

Figure 6:
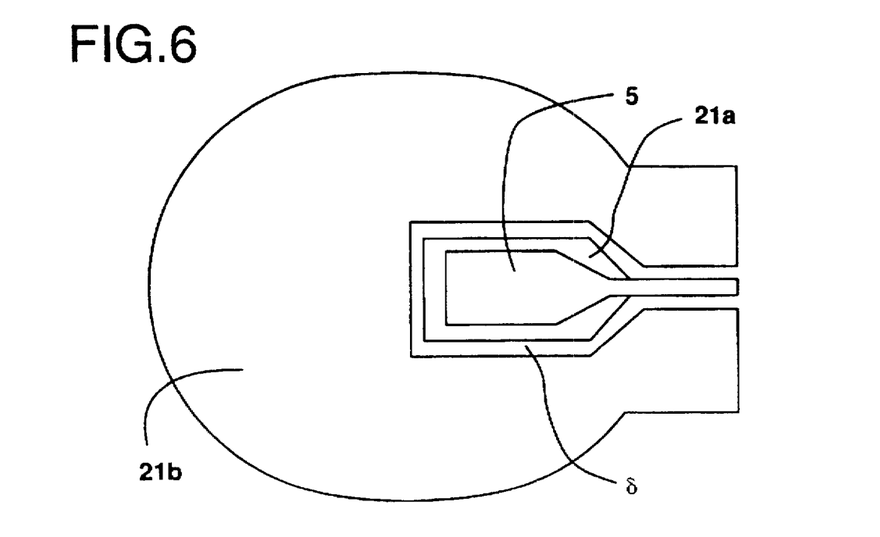
FIG. 6 is a plan view which illustrates other shapes of the lower core portion and a coil support portion.

Note that the shape of the lower core portion 21a is not limited to the elongated shape while being permitted to be formed into an arbitrary shape by patterning the resist film R1. For example, the lower core portion 21a may be formed into a shape having a narrow leading portion as shown in FIG. 6. By forming the lower core portion 21a into the shape having the narrow leading portion and by similarly forming the upper core layer 5 formed on the lower core layer 21a into a shape having a narrow leading portion, the cross sectional area of the magnetic passage in the gap portion can be further reduced. Therefore, the inductance can be lowered furthermore.

Although the foregoing embodiment has the arrangement that the lower core portion 21a and the coil support portion 21b made of the Permalloy plated layer 21 also serve as the upper shield layers for the reproducing head portion h1, another arrangement may be employed in which an upper shield layer having a predetermined area is individually formed on the upper gap layer 15 of the reproducing head portion h1, the lower core portion 21a and the coil support portion 21b are formed on the upper shield layer on the two sides of the insulating layer, and the coil layer 6 and the upper core layer 5 are formed on the lower core portion 21a and the coil support portion 21b.

As described above, according to the present invention, the arrangement that the lower core portion is separated from the coil support portion having the area for forming the coil layer enables the cross sectional area of the magnetic passage in the lower core portion to be reduced. Therefore, the inductance of the magnetic circuit of the inductive magnetic head consisting of the lower core portion, the upper core layer and the coil layer can be lowered. Thus, the recording efficiency can be improved. Since the coil layer is formed on the coil support portion and the lower core portion having predetermined areas, the coil layer can be formed on a region having no step.

Since the coil support portion and the lower core portion of the inductive magnetic head are also used as the shield layers for the reproducing head portion, the number of layers required to form the combined-type thin film magnetic head can be decreased. Consequently, a thin magnetic head can be obtained.

Although the invention has been described in its preferred form with a certain degree of particularity, it is understood that the present disclosure of the preferred form can be changed in the details of construction and the combination and arrangement of parts may be resorted to without departing from the spirit and the scope of the invention as hereinafter claimed.

What is claimed is:

1. A combined-type thin film magnetic head comprising:

a reproducing head portion including a magnetoresistive device and an insulating layer formed over the magnetoresistive device; and an inductive magnetic head formed over said reproducing head portion, wherein said inductive magnetic head includes:

a magnetic material layer formed on an upper surface of said insulating layer, the magnetic material layer having an upper surface;

an insulating material formed on the upper surface of the magnetic material layer, the insulating material defining an opening;

a coil formed on an upper surface of the insulating material;

an upper core layer connected to the upper surface of said magnetic material layer through said opening and extending over said coil; and a magnetic gap formed between said magnetic material layer and said upper core layer;

wherein the magnetic material layer includes a lower core portion located under the upper core layer and a first portion of the coil, and a coil support portion located under a second portion of the coil, wherein the lower core and the coil support portion are separated by a gap, wherein said insulating material is injected into the gap located between said coil support portion and said lower core portion, and wherein the upper surfaces of the coil support portion and the lower core portion are co-planar.

* * * * *